United States Patent [19]

Cucci et al.

[11] Patent Number: 4,681,293
[45] Date of Patent: Jul. 21, 1987

[54] ISOLATING MOUNT FOR EXTERNAL VIBRATION SENSITIVE SENSOR

[75] Inventors: Gerald R. Cucci, Minneapolis; Thomas P. Peterson, Minnetonka, both of Minn.

[73] Assignee: Rosemount Inc., Eden Prairie, Minn.

[21] Appl. No.: 842,758

[22] Filed: Mar. 24, 1986

Related U.S. Application Data

[63] Continuation of Ser. No. 761,342, Jul. 31, 1985, abandoned, which is a continuation of Ser. No. 320,211, Nov. 12, 1981, abandoned.

[51] Int. Cl.$^4$ .......................................... F16M 13/00
[52] U.S. Cl. ................................. 248/603; 248/605; 267/153
[58] Field of Search ............... 248/603, 605, 609, 638, 248/634, 621, 624; 267/153, 141.1, 140; 73/430

[56] References Cited

U.S. PATENT DOCUMENTS

| | | | |
|---|---|---|---|
| 2,042,666 | 6/1936 | Kunkle | 248/605 |
| 2,685,913 | 8/1954 | Schlueter | 248/624 |
| 2,801,045 | 7/1957 | Philipp | 248/624 |
| 2,900,161 | 8/1959 | Crede | 248/638 |
| 4,380,847 | 4/1983 | Tajima | 248/624 |

FOREIGN PATENT DOCUMENTS

| | | | |
|---|---|---|---|
| 0013974 | 4/1926 | Netherlands | 248/605 |
| 0542258 | 8/1940 | United Kingdom | 248/603 |
| 0546525 | 7/1942 | United Kingdom | 267/141.1 |

Primary Examiner—Ramon O. Ramirez
Attorney, Agent, or Firm—Kinney & Lange

[57] ABSTRACT

An isolating mount provides vibration isolation for a sensor that is sensitive to external vibration about a rotational axis thereof at low frequencies, and translational vibrations in all axes at high frequencies. The isolation mount comprises a frame surrounding the sensor, and includes a plurality of columnar or beam members which are flexible in shear and stiff in compression. The beam members have longitudinal axes which lie in a common plane, also defined by the X-Y axes of the sensor. Connector members to couple desired beam members between the frame and the sensor and other connector members couple other beam members from the frame to the main support structure. The beam members flex in both the X and Y axis and also the Z axis, which is perpendicular to the common plane, but because the beam members are very stiff in compression, the resistance to any rotational movement about the Z axis is high. The columnar members are made up of a plurality of generally parallel metal shims which are molded together with a suitable elastomeric material and wherein the shims are spaced to obtain the desired flexing in shear and stiffness in compression for the mounting.

3 Claims, 12 Drawing Figures

ISOLATING MOUNT FOR EXTERNAL VIBRATION SENSITIVE SENSOR

CROSS REFERENCE TO RELATED APPLICATION

This application is a continuation of copending application Ser. No. 761,342, filed July 31, 1985 for Isolating Mount For External Vibration Sensitive Sensor, which in turn is a continuation of Ser. No. 320,211, filed Nov. 12, 1981 for Isolating Mount For External Vibration Sensitive Sensor, both now abandoned.

BACKGROUND OF THE INVENTION

1. Field of the Invention

The present invention relates to vibration isolation devices that provide different degrees of stiffness in shear and compression to provide rotational stiffness in direction about one of the X, Y and Z axes of a sensor while permitting deflections in direction transverse to such axes.

2. Description of the Prior Art

In development of isolation devices, original concepts utilized a molded beam member comprising a pluralit of generally parallel, uniformly spaced plates or shims molded together with an elastomeric material. Connectors were provided at opposite ends. This work was originally reduced to practice by other than the present inventors and forms prior art to the invention herein under 35 USC 102(g).

However, such beam member did not provide the necessary isolation vibration in shear and stiffness in rotational direction about an axis for the sensor involved. The plates were evenly spaced along the beam length, and while two different spacings were used in experimenting, by merely adjusting the spacing it was not possible to attain a desired result wherein the beam member has a relatively low linear resonant frequency, for example 30 Hz and a substantially higher rotational resonant frequency, for example 200 Hz and hold the sway spacing to an acceptable level. When there is a substantial difference between the linear and rotational resonant frequencies, linear vibrations are substantially decoupled from the rotational vibrations. In other words, when sufficient rigidity in rotational direction about the Z axis of the sensor comprising the beams was obtained to raise the resonant frequency of mounting in such rotational direction, the resonant frequency of the second linear resonant mode in direction along the X, Y and Z axes was too high. Too little isolation of the sensor was provided at high frequencies.

SUMMARY OF THE INVENTION

The present invention relates to vibration isolation mountings for sensors that are relatively sensitive to movement in the sensor case in rotation about one axis of the sensor and also require a mounting which provides low natural frequencies in the linear axes of vibration. The vibration mounting comprises a columnar or beam member made up of a series of spaced, generally parallel shims molded into a beam with a suitable elastometric material between the shims, and wherein the compressional stiffness of the member is high while the shear stiffness is controlled to provide a low resonant frequency and the necessary support in the linear axes of vibration. Some of the molded beam members are coupled at first ends to a support frame which surrounds the sensor and at their opposite ends to the sensor to be mounted. Additional beamsare used between the support frame and the main mounting structure to which the sensor is mounted. The beam members are sufficiently rigid in compression, and, while soft in the X, Y and Z linear axes, are firm enough to adequately support the sensor without excessive sag or hystersis in the beams.

The preferred embodiment of the invention comprises increasing the spacing of the shims in the center portions of the beam members to obtain a substantially linear deflection from end to end when the beam members ae moved in shear transverse to their longitudinal axes, but yet providing adequate stiffness in compression along the longitudinal axis of the separate beams.

Another form of the invention comprises providing a through hole in longitudinal direction through the shims and selecting a higher modulus for the elastomeric mounting to provide the axial stiffness required with adequate transverse softness for low resonant frequency of the mounting along the X, Y and Z axes. A combination of unequal shim spacing and a center hole is also disclosed, along with an embodiment where the exposed perimeter surface area is significantly increased by having an irregular cross sectional shape to the shims and elastomeric material.

The present invention, with sensor, is a compound isolator with two degrees of freedom in each of three linear axis and two degrees of freedom about each of three rotational axis. The sensor is affected by linear vibrations at high frequencies. Therefore both linear modes in each axis of the shock mount system must occur at frequencies below the frequency range at which the sensor is affected. Furthermore, to minimize the packaging volume of the shock mount system the first linear resonant mode in each axis must not be too low in frequency. In a typical application 30 Hz may represent a lower practical limit.

The particular sensors used are adapted for aerospace applications, so large mounting frames cannot be tolerated. The construction therefore shown achieves the desired result of providing a small package that is adquately vibration isolated with a low natural frequency mounting. While the rotational stiffness about one of the axes has a resonant frequency that is substantially higher.

DETAILED DESCRIPTION OF THE PREFERRED EMBODIMENTS

Figure 1:
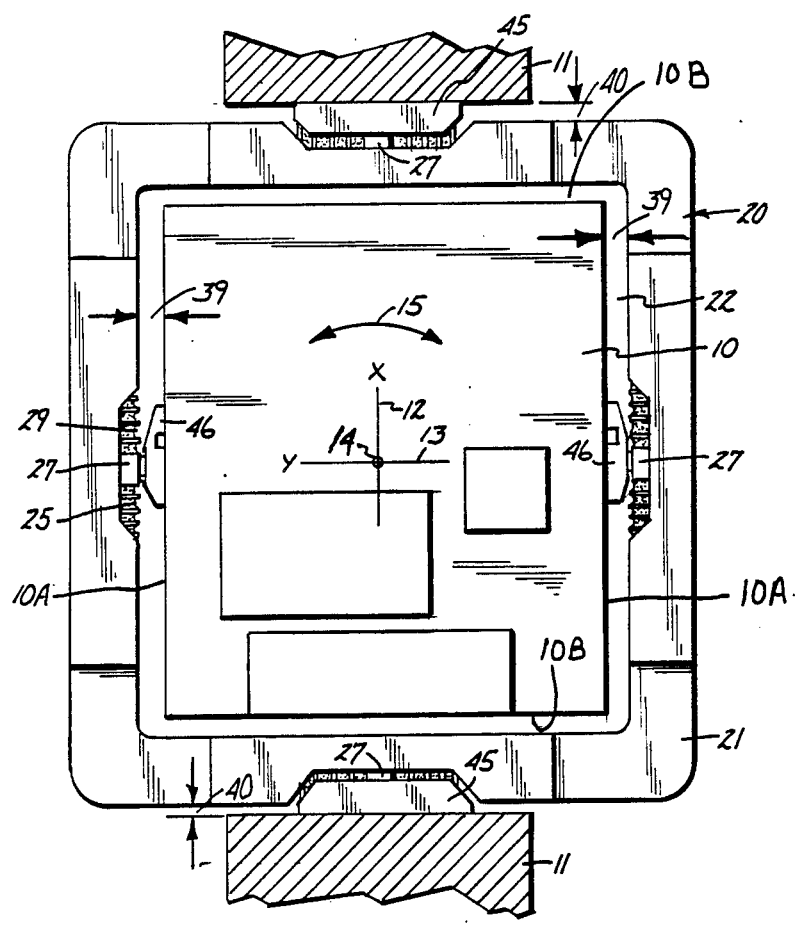
FIG. 1 is a top plan view of a sensor mounted in a support utilizing the isolation mounting made according to the present invention.

FIG. 1 illustrates a sensor indicated at 10 that is to be vibration isolated at desired frequencies with respect to a supporting structure schematically shown at 11. The supporting structure 11 is the frame of an air vehicle or other mounting device which is subject to vibrations from which the sensor is to be isolated.

Figure 2:
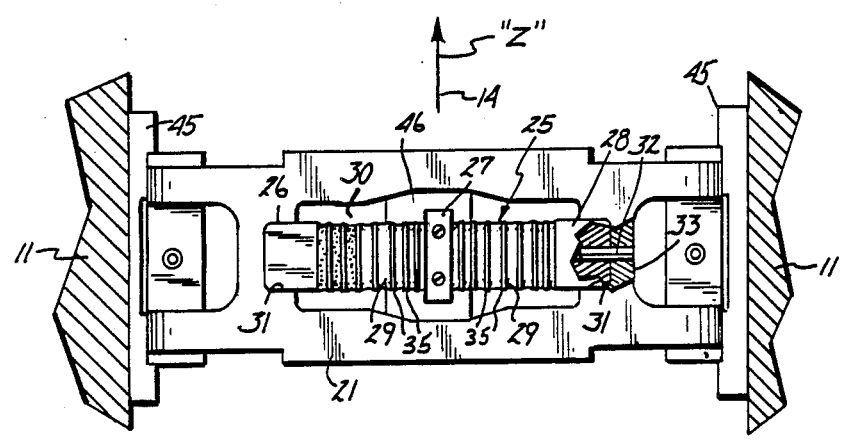
FIG. 2 is a side elevational view taken from the right side of the device of FIG. 1 shown with the support member broken away.

The sensor 10 is a vibrating beam sensor such as that shown in U.S. Pat. No. 4,311,053 and assigned to the same assignee as this application. The vibrating beam sensor 10 operates on the principle that the natural frequency of a vibrating beam is changed in dependence upon a parameter that is being sensed by loading the beam in tension. The tension loading for the beam of sensor 10 is provided by a pivoting member that pivots about a pivot axis to change the tension in the beam in response to a parameter such as pressure. In the form shown, the sensor and the mounting housing for the sensor 10 are considered to have X and Y axes 12 and 13 shown in FIG. 1, and a Z axis 14 which is perpendicular to the plane defined by the X and Y axes. The Z axis is shown in FIG. 2. The pivoting member that loads the sensor vibrating beam, as disclosed in said patent, pivots about an axis that is parallel to the Z axis 14.

Any movements that occur in rotation about the Z axis as indicated by the double arrow 15 can affect the tension in the vibrating beam due to a couple being formed about the pivot of the loading member for the vibrating sensor beam. This affects the output of the sensor and can lead to erroneous readings.

Lateral movement along the X, Y and Z axes, at high frequencies also lead to erroneous readings. The sensor 10 should be permitted to flex on its mountings at very low frequencies to absorb and isolate vibrations in those directions.

The sensor 10 is mounted through an isolation assembly 20 comprising an outer frame 21 which surrounds the perimeter of the sensor 10 and in the form shown is generally square or rectilinear. The frame is spaced from the outer edges of the sensor by a space indicated at 22. The frame 21 is mounted on two of its sides to the support structure 11 through two of the vibration isolator members indicated at 25. Two additional isolator members 25 are mounted to the sides of the frame 21 ninety degrees from the mounting to the support structure 11. The additional isolator members 25 are used for supporting the sensor 10 relative to the frame. Each of the isolator members 25 is constructed in a similar manner but have different coupling members attached thereto, as will be explained.

Figure 3:
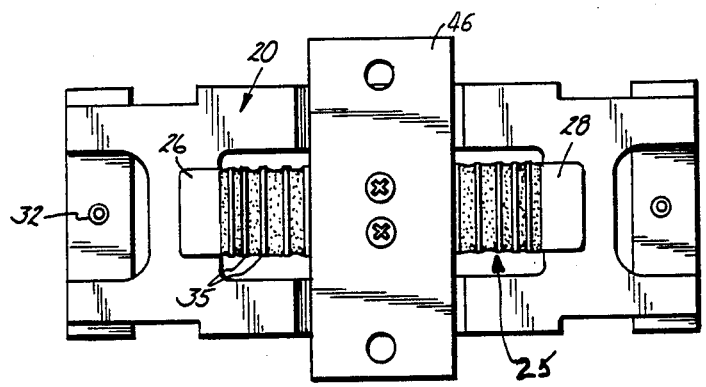
FIG. 3 is a side elevational view of a side 90° to the side of the device shown in FIG. 1.
Figure 4:
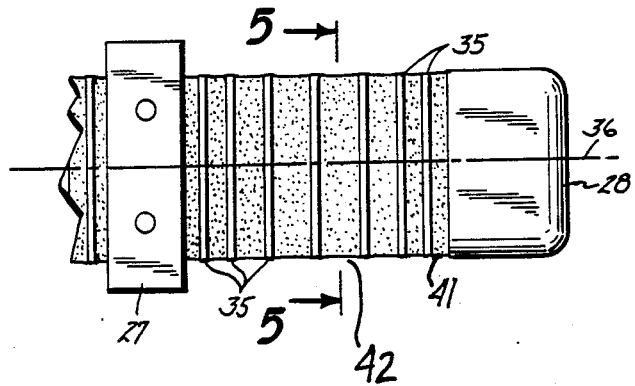
FIG. 4 is an enlarged side view of a typical beam member used for support showing the details of the preferred embodiment of the mounting.

Referring specifically to FIGS. 2, 3 and 4, the isolator members 25 as shown each have a first end member or connector 26, a center connector 27, and a second end member or connector 28. The frame 21 has openings 30 provided in each of its sides, and the end portions of the openings 30 form receptacles 31,31 which receive the connectors 26 and 28, respectively. The connectors 26 and 28 are fastened to the frame in a suitable manner, as shown with a spring pin 32 passing through a portion of the frame indicated at 33 and into the end connector. An isolator beam section 29 is formed between the respective end connector and the center connector.

Figure 5:
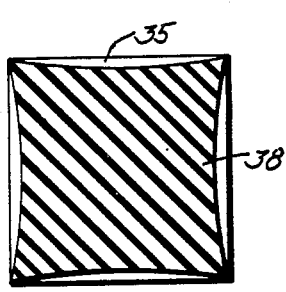
FIG. 5 is a sectional view taken as on line 5—5 in FIG. 4.

Each isolator member 25 is constructed as a molded assembly of two beam sections. Each beam section 29 as shown in FIG. 4 comprises a plurality of metal shims 35, that are parallel to each other and are spaced apart, and which are centered on and perpendicular to a longitudinal axis 36 of the beam section 29. The end connectors 26 and 28, the center connector 27, and the shims are all molded in a unit with suitable elastomeric material shown at 38 between and molded to the shims and molded to the end connectors as well. FIG. 5 shows a typical molding configuration where the elastomeric material 38 adheres to a shim 35.

The shims are held in position during the molding operation with less spacing between the shims adjacent the end connector 26 and connector 27 and adjacent end connector 28 and the connector 27 than the spacing in the center portions of each of the beam sections 29. For example, the spacing shown at 41 between the end connector 28 and the first shim 35 is quite small, while the spacing shown at 42 in the center of each of the beam sections 29 is larger.

Thus, the ends of the beam sections 29 are stiff and resist flexural bending. The centers of the beam sectios are compressionally more compliant because the shape factor (the ratio of the force loaded area to the force free area) of the elastomer is greater. Movement in the X, Y and Z axes causes the beam sections to deflect transverse to the longitudinal axis of the beam sections, and with the greater resistance to flexural bending near the ends of the beam sections. The deflection curves of the beam is substantially linear along its length. The closer shim spacing and added stiffness near the ends of the beam sections also provides the flexural rigidity needed to improve the sag and sway space characteristics. Performance of the sensor 10, isolator members 25 and frame 21 is further enhanced in that such linear loading along the length of the isolator members keeps the sway space, both sensor to perimeter frame indicated at 39 and frame to supporting structure, indicated at 40, to a minimum. Space utilization is a very important consideration in air vehicle performance and vendor selection for air vehicle components. It is extremely important that sufficient sway space is available such that the sensor housing not hit the frame during maximum vibration and also that the frame not hit the supporting structure.

In addition to the sway space required for static acceleration and vioration an amount of sway space must be allowed for sag at the elastomeric mount. The sag is the amount of non-return of the shock mount to its original position after it has been deflected. The amount of sag is affected by the elastomeric material used, the amount of flexural bending and other factors.

The beam sections provide for low natural frequency in direction along the X, Y and Z axes but still they provide sufficient resistance to flexural bending to prevent sag. The elastomeric material filling the spacings 41 and 42, in each of the spacings between the shims is not of sufficient quantity to make the isolator members soft in longitudinal compression.

There is little sag in the unit when mounted on the isolator members 25, but yet there is adequate resistance to compression in rotational direction as indicated by the double arrow 15, about the Z axis.

In the actual mounting assembly, the connectors 27 on the isolator members 25 which couple the frame 21 to the support structures 11 have junction members 45 that are mounted to the connectors 27 with threaded connectors and in turn they are suitably connected to the support structure 11. The isolator beam members 25 on the sides of the frame where the sensor is supported have connectors 46 fastened to the center connectors 27 of the isolator beam members and these connectors 46 in turn are suitably attached to vertical surfaces of the housing for the sensor 10. It should be noted that the sensor 10 has a box-like construction, with planar surfaces along its side edges shown at 10A and 10B, respectively, and the surfaces 10A are used for coupling to the connector members 46.

The mounting shown provides a response in shear that permits isolation in the X, Y and Z axes with a resonant frequency in the range of 30 to 40 Hz, while the isolation natural frequency in rotational movement about the Z axis is substantially higher, preferably 200 Hz. The modulus of the rubber or elastomeric material between the shims may be selected to meet the physical requirements of the mounting such as weight and moment of inertia about the Z axis of the sensor.

Figure 6:
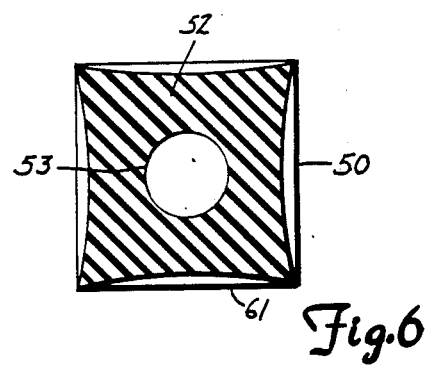
FIG. 6 is a sectional view taken substantially on the same line as FIG. 5, but of a modified form of the invention.

FIG. 6 is a modified form of the invention for an isolator beam section 50 which would make up a beam section corresponding to beam section 29. The shims 51 are molded with elastomeric material 52 between the shims, and an opening 53 is longitudinally formed through the shims and the elastomeric material. The modulus of elasticity of the elastomeric material is raised so the elastomeric material is stiffer. The opening reduces the shape factor of the elastomer to provide greater free surface area permitting bulging or shifting of the elastomer and thus, less compressional resistance transverse to the longitudinal axis than normal without the center hole, and, also, preventing excessive sag. The close spacing of the shims near the points of attachment provides resistance to flexural sag. Yet the stiffer elastomeric material provides adequate compression resistance so that sag is not excessive.

Figure 7:
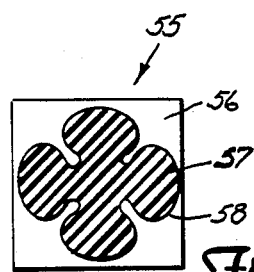
FIG. 7 is a sectional view taken on substantially the same line as FIG. 5, but of a further modified form of the present invention.

A further modified form of a beam section is used in the isolator beam member as illustrated in FIG. 7 as indicated at 55. In this instance, the end connector 56 is shown rectangular in cross sectional view as in the previous forms of the invention, but the beam section cross section has an irregular molded configuration as indicated at 57. The cross sectional shape shown at 57 is the shape of the shims, as well as the molded elastomeric material, a shape such as a bisymmetric fluted shape of four flutes and valleys, such as a four leaf clover.

The beam forms a cross section that has a perimeter line that reaches a plurality of maximum and minimum radii with bisymmetric shape. The beam section thus has a perimeter that is irregular and provides for a high amount of perimeter length and surface around the perimeter indicated at 58 in relation to its cross sectional area, which is shown crosshatched in FIG. 7. While a four leaf clover shape is shown, deeply fluted designs will also work to provide the high cross section perimeter length to area ratio.

In this particular instance, the deflection characteristics are similar to those of the form shown in FIG. 6 in that the hole 53 in the beam section shown in FIG. 6 increases the peripheral exposed surface of the elastomer that permits bulging of the elastomeric material under shear loads which tends to compress one side of the beam section and place the other side under tension. A slight shifting of the material as it stretches during shear loading is permitted so that the deflection characteristic of the beam section axis becomes substantially linear as will be shown in relation to FIGS. 8, 9 and 10.

Thus the compression to shear stiffness ratio of the beam section 55 shown in FIG. 7 is controlled by having sufficient perimeter area of the elastomeric material in relation to the cross sectional area bonded to the shims. The sway space requirement thus is controllable within desired limits without exceeding the desired resonant frequency under rotational vibration.

Figure 8:
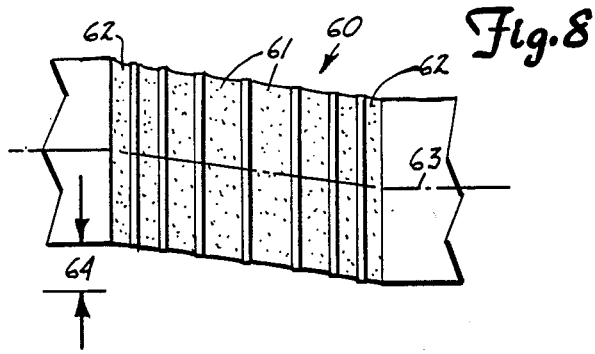
FIG. 8 is a schematic representation of the deflection of an isolator beam section in its deflected state according to the first form of the present invention.

FIG. 8 is a schematic representation of an isolator beam section made according to the present invention shown to illustrate the deflection characteristics when the beam section is under load. As shown, the beam section 60 has a plurality of shims molded to elastomeric material between the shims, with the spacing between the shims wider in the center portions of the beam section as indicated at 61 than near the mounting connectors which are indicated at 62. The central axis of the beam section represented at 63 assumes substantially a straight line even though the end connectors are loaded so that they are offset by a deflection distance indicated at 64. The sway space restraint is satisfactory in this instance when shims are arranged as shown, while providing the necessary compliance in linear modes of vibration and the required stiffness in rotation about the sensor Z axis. The gaps filled with elastomeric matrial as shown at 61 in the center portions of the beam sections share the shear loading and resist excessive flexural bending.

Figure 9:
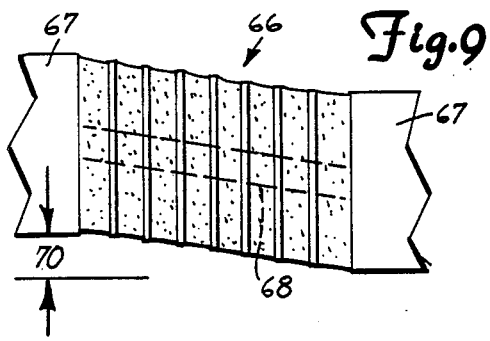
FIGS. 9 and 10 are schematic representations of the deflectio of an isolator beam section made according to a second form of the present invention in two different embodiments.

In FIG. 9 a beam section 66, which has even spacing between the shims and filling of elastomeric material between such shims is shown. The end connectors 67 support the beam section under its loaded conditions as illustrated. The opening through the center of the beam section is shown in dotted lines at 68. The deflection of the beam indicated at 70 is satisfactory for operation with the sway space available. It can also be seen that the central axis of this beam section in FIG. 9 is substantially straight when under load as well.

Figure 10:
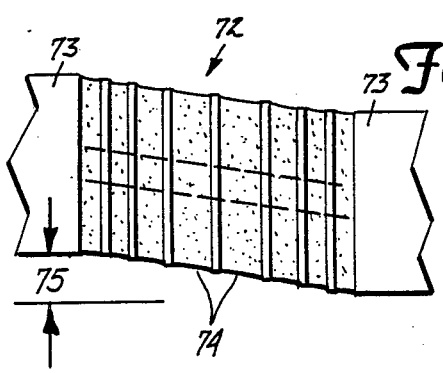

In FIG. 10, a beam section shown at 72 is provided with connector members 73 and has a plurality of spaced shims with a molded filling of elastomeric material between the shims. The shims are spaced farther apart in the center portions of the beam section as shown at 74. The beam section also is provided with a through center hole along its longitudinal axis. The load causes a substantially linear bending or deflection as represented by the central axis of the beam section, and this provides for an acceptable sway space, indicated at 75.

Figure 11:
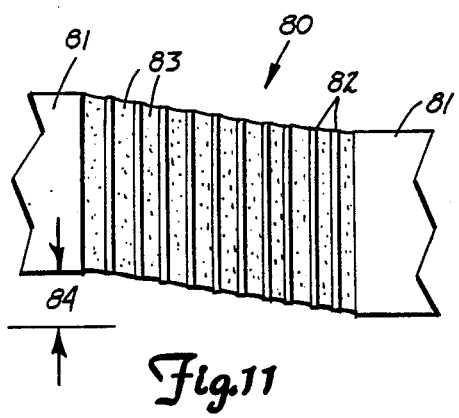
FIG. 11 is a schematic representation of a prior art device having equal but excessively close shim spacings forming the isolator beam section.

In FIG. 11 a prior art beam section indicated at 80 is shown schematically. This has coupling members 81 at its opposite ends, and metal shims 82 that are evenly spaced with a filling of elastomeric material 83 molded to and extending between the shims. In this form the plates or shims 82 are close together to meet the sway space requirement where the beam section is loaded under shear. The elastomeric material between the plates deforms symmetrically under shear, but the beam section is too stiff in axial direction. The deflection for this particular beam section under load, indicated at 84, is satisfactory for sway space requirements, but the isolation characteristics are not acceptable because the second linear mode in the X and Y axes occurs at too high a frequency.

Figure 12:
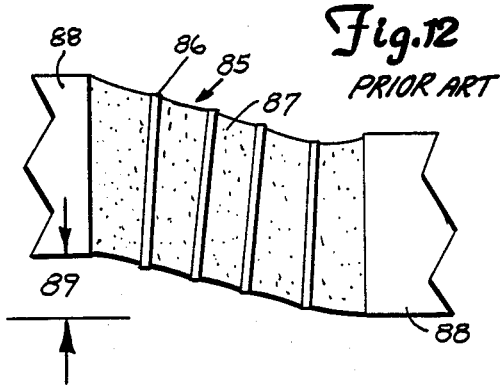
FIG. 12 is a schematic representation of a prior art isolator beam having shims separated excessively by a filling of elastomeric material.

In FIG. 12, a prior art beam section indicated at 85 is made with a plurality of shims 96 which are spaced apart with a quantity of elastomeric material 87 between the shims. There are end connectors 87 at the end of the beam section. The spacing of the shims 86 is great enough in this instance to provide for sufficient isolation characteristics in axial compression so that resonant frequency for rotational motion is in the desired range. When subjected to forces causing shear in the beam as the shims near the center of the beam section respond to the shear forces and the deflection indicated at 89 is much too great to be acceptable for the sway space requirements of the sensor and would permit the sensor to hit the frame, or the frame to hit the supporting structure as illustrated in FIG. 1 by the sway spaces 39 and 40 provided.

In the prior art it is known that vibration is reduced by minimizing "coupling" conditions, that is, minimizing the effect of linear vibration on rotational vibration and vice versa, in two basic ways. First by reducing the eccentricity of the elastic center (center of elasticity) of the vibration isolation system with respect to the center of gravity of the sensor being mounted. The rotational force is minimized if the center of elasticity and the sensor center of gravity coincide. The second way of minimizing the "coupling" of vibration is by separating or decoupling the modes of vibration, that is, the linear rotational resonant frequencies are far enough apart so they do not interact. The beam section constructions of the present invention provide this by having low resonant frequencies in primary linear modes (side to side movement of the sections) and higher resonant frequencies in the rotational modes about the Z axis (axial loading on the beam section).

All forms of the invention shown are adjusted mechanically in the sense that they reduce the amount of shim material in the isolator members (which comprise two beam sections as shown) in a way to effectively provide a satisfactory compression to shear stiffness ratio of the individual beam sections. This is particularly difficult in the extremely small sizes of the beam sections that are being utilized.

By way of example, a typical sensor 10 will have a length and width in the range of two inches (the width may be slightly less than the length) and a height of about 1.125 inches. The clearance or sway space 39 between the sensor edges and the outer frame may only be in the range of 0.125 inches on the sides where the sensor is supported by the isolator members relative to the surrounding frame and there is slightly less sway space (as shown at 40) on the ends where the isolator members 25 are mounted from the frame to the support structure.

Therefore it can be seen that flexural sag must be minimized. Further, the shim size may for example be a length approximately one-fourth inch by one-third inch on the sides and the shim spacing typically is quite small, in the range of 0.05 inches in the center portions where the spacing is greater. In the preferred embodiment the shim spacing is reduced between shims adjacent the end connectors. One of the limiting features in the design is the molding operation. If the shims get too close together the elastomeric material cannot be easily molded between the shims.

Essentially in all forms of the invention the compression to shear stiffness ratio ($K_c/K_s$) is reduced by controlling the spacing between the shims of the beam sections to be larger in their center portion, or by providing a large perimeter to area ratio of the beam sections when the assembly is molded with elastomeric material.

It should be noted that the modulus of elasticity the elastomeric material can be selected to minimize sag, particularly in the instance of the unequal spacing of the metal shims. The unequal spacing between the shims along the length of the isolator beam sections permits control over the overall compression to shear stiffness ratio and in this way provides for adequate deflection and damping along the X, Y and Z aces, with adequate stiffness against rotation about the Z axis. The isolator beam sections thus provide isolation, and low resonant frequency in the three primary degrees of translational freedom of vibration but with adequate separation between the X and Y resonant frequencies and the rotational resonant frequency about the Z axis.

Additionally, the mass and moment of inertia of the outer frame can be changed somewhat for adjusting the isolation characteristics of the overall assembly.

Looking at the problem another way, the increased spacing of the shims in the center portions of the beam sections increases the exterior surface area of the elastomer filling between the shims to present more regions for the elastomer to tend to bulge out under compression. During flexural bending of the beam sections, one side is in compression and the other is in tension. By providing the hole in the center of the beams, (or the irregular cross section shown as a cloverleaf in FIG. 7) there is more exterior surface area of the elastomeric filling (part of the exterior surface area then would be around the opening down the center of the beam in the form shown in FIG. 6) to provide for adequate control of the compression to shear ratio.

The beam sections 29 as shown form effective isolator members and while they are formed in end to end pairs to form the isolator members 25, the beam sections 29 can be made individually and attached individually to the members 45 or 46 if desired.

What is claimed is:

1. In combination an isolation assembly and a sensor having X and Y axes defining a plane and a Z axis perpendicular to said plane, said sensor being sensitive to rotational movement about the Z axis, and which sensor is to be vibration isolated comprising a sensor body, a frame surrounding said sensor body, and a plurality of first isolator beam sections supporting said sensor body in at least two diametrically opposed locations, said first beam sections being attached to said frame and to said sensor body, said first beam sections being subjected to compression when the sensor is subjected to forces tending to rotate it about its Z axis, and being subjected to shear when the sensor is subjected to forces tending to move it in direction along the X, Y or Z axes, said isolator beam sections each comprising a molded assembly of a plurality of generally parallel thin shims and layers of elastomeric material substantially filling the space between said shims extending alternately along the length of the beam section, one end of each beam section being attached to the frame and the other end of each beam section being attached to the sensor, each beam section comprising a greater spacing between said shims adjacent the center portions of each beam section than adjacent the ends thereof, so the layers of elastomeric material are thicker in direction along the length of the beam section in the center portion of the beam section.

2. The assembly of claim 1 wherein the frame is supported relative to a supporting structure by a plurality of second beam sections constructed as the first beam sectios and the second beam sections being attached to said frame and said support structure at opposite ends thereof.

3. The assembly of claim 1 wherein the beam sections provide softness in shear loading so that the natural frequency is in the range of 30 Hz in direction along the X, Y and Z axes and substantially higher in rotation about one of said axes.

* * * * *

UNITED STATES PATENT AND TRADEMARK OFFICE
CERTIFICATE OF CORRECTION

PATENT NO. : 4,681,293
DATED : July 21, 1987
INVENTOR(S) : Gerald R. Cucci et al.

It is certified that error appears in the above-identified patent and that said Letters Patent is hereby corrected as shown below:

Column 1, line 27, delete "pluralit" and insert --plurality--.

Column 2, line 1, delete "beamsare" and insert --beams are--.

Column 2, line 12, delete "ae" and insert --are--.

Column 2, lines 41 and 42, delete "adquately" and insert --adequately--.

Column 3, line 5, delete "deflectio" and insert --deflection--.

Column 4, line 32, delete "sectios" and insert --sections--.

Column 4, line 40, delete "curves" and insert --curve--.

Column 8, line 17, delete "aces" and insert --axes--.

Column 9, line 9, delete "sectios" and insert --sections--.

Signed and Sealed this

Twelfth Day of January, 1988

*Attest:*

DONALD J. QUIGG

*Attesting Officer*  Commissioner of Patents and Trademarks